(12) United States Patent
Samad et al.

(10) Patent No.: US 6,872,313 B1
(45) Date of Patent: Mar. 29, 2005

(54) DOMESTIC WASTEWATER TREATMENT SYSTEM

(75) Inventors: Nidal A. Samad, Merritt Island, FL (US); Alfredo J Teran, Cape Canaveral, FL (US); W Todd Willoughby, Merritt Island, FL (US)

(73) Assignee: Agrimond USA Corporation, Cape Canaveral, FL (US)

( * ) Notice: Subject to any disclaimer, the term of this patent is extended or adjusted under 35 U.S.C. 154(b) by 0 days.

(21) Appl. No.: 10/605,342

(22) Filed: Sep. 23, 2003

Related U.S. Application Data
(60) Provisional application No. 60/319,570, filed on Sep. 23, 2002.

(51) Int. Cl.[7] .................................................. C02F 3/30
(52) U.S. Cl. ........................ 210/630; 210/622; 210/631; 261/108
(58) Field of Search .................... 210/605, 620, 210/621, 622, 630, 631; 261/77, 108, DIG. 42

(56) References Cited

U.S. PATENT DOCUMENTS

| | | | | |
|---|---|---|---|---|
| 3,945,918 A | * | 3/1976 | Kirk ............................ | 210/703 |
| 4,160,724 A | * | 7/1979 | Laughton ..................... | 210/605 |
| 4,269,791 A | * | 5/1981 | Hills ........................... | 261/36.1 |
| 4,271,026 A | * | 6/1981 | Chen et al. .................. | 210/605 |
| 4,278,546 A | * | 7/1981 | Roesler ....................... | 210/626 |
| 4,304,665 A | * | 12/1981 | Hines .......................... | 210/194 |
| 4,555,335 A | * | 11/1985 | Burris ......................... | 210/192 |
| 4,603,035 A | * | 7/1986 | Connell et al. .............. | 423/226 |
| 4,824,563 A | * | 4/1989 | Iwahori et al. ........... | 210/195.1 |
| 5,772,886 A | * | 6/1998 | Bettle ......................... | 210/605 |
| 6,113,787 A | * | 9/2000 | Czermak et al. ............. | 210/605 |
| 6,132,614 A | * | 10/2000 | Perslow et al. ............. | 210/605 |
| 6,183,643 B1 | * | 2/2001 | Goodley ..................... | 210/605 |
| 6,368,508 B1 | * | 4/2002 | Gatz et al. .................. | 210/630 |
| 6,379,545 B1 | * | 4/2002 | Perslow et al. ............. | 210/605 |
| 6,464,210 B1 | * | 10/2002 | Teran et al. ................. | 261/79.2 |

FOREIGN PATENT DOCUMENTS

| | | | |
|---|---|---|---|
| DE | 10143600 A1 | * | 3/2003 |
| JP | 54-108458 A | * | 8/1979 |

* cited by examiner

*Primary Examiner*—Fred G. Prince
(74) *Attorney, Agent, or Firm*—Anton J. Hopen; Smith & Hopen, P.A.

(57) ABSTRACT

A method for treating domestic wastewater, in situ, in a single tank. The use of which obviates the need for traditional septic tanks as well as lessening the burden, and reliance on, central water treatment plants. The resulting water is stored for non-potable reuse, thus lessening impact on public water supplies for domestic-utility use. The method is not limited to residential use but is equally applicable to boats, recreational vehicles, hotels, resorts, clubs, rest areas, apartment complexes, and the like.

15 Claims, 12 Drawing Sheets

DOMESTIC WASTEWATER TREATMENT SYSTEM

PRIORITY CLAIM

This application claims priority from U.S. Provisional Patent Application No. 60/319,570 filed Sep. 23, 2002.

BACKGROUND OF INVENTION

Field of Invention

This invention relates to a method for the treatment of domestic wastewater that does not require multiple tanks or transmission of the wastewater to a central treatment facility.

SUMMARY OF INVENTION

The inventive method relates to treating domestic wastewater, on site, in a multi-step process which replaces the use of the traditional septic tank while providing, and conserving, water which can be re-used for non-potable purposes. The disclosed method is applicable to any facility that produces "domestic" wastewater and is not limited to residential homes. The inventive method is equally suited for use in boats, recreational vehicles, hotels, resorts, clubs, rest areas, apartment complexes, and the like.

Figure 11:
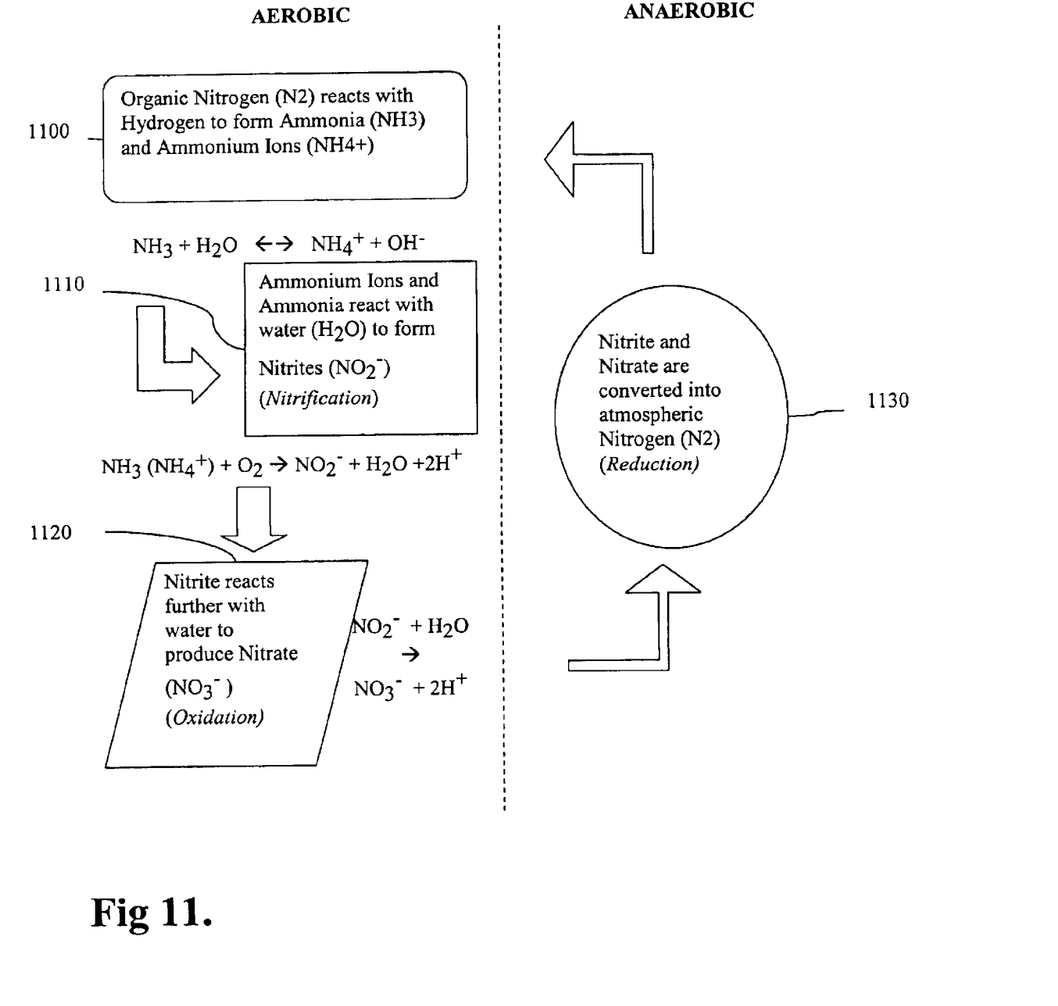
FIG. 11 is a diagrammatic view of the aerobic biologic process whereby organic nitrogen is converted to Nitrate and Nitrite.

In practice, the treatment of the wastewater is achieved in 4 steps. In the first step (Aerobic Step) the wastewater begins in a storage tank and enters a mixing loop, where it is mixed with air, or oxygen, thus ensuring that the bacteria remain in contact with the column of wastewater. The mixing loop can be any device that allows the introduction of a gas, here oxygen or air, and provides for the gas to be dissolved in water. Examples include a venturi followed by a static mixer or a simple bubble-diffuser and contact column. The water then reenters the holding tank. The process whereby the organic nitrogen present in the wastewater is converted into nitrite and nitrate is delineated in FIG. 11. Organic nitrogen combines with hydrogen to form to form ammonia and ammonium ions 1100. These two elements are in constant flux, and continue to change states. In the presence of water, 1110, beneficial bacteria, such as *Nitrosomonas*, convert the ammonia and ammonium ions to Nitrites ($NO_2$). Finally, another strain of bacteria, such as *Nitrobacter*, convert the Nitrite ($NO_2$) to Nitrate ($NO_3$), 1120. Finally, Nitrite and Nitrate are converted into atmospheric Nitrogen, 1130.

The second step (Anaerobic Step) is a continuation of the biological filtration and is achieved anaerobically. The wastewater is passed through the same mixing loop but with without exposure to oxygen. It is in this step that the Nitrate-Nitrogen produced in the aerobic phase is reduced into Nitrogen and Nitrogen-oxide gases, which are released from the wastewater. After passing through the mixing loop the wastewater reenters the holding tank.

Figure 12:
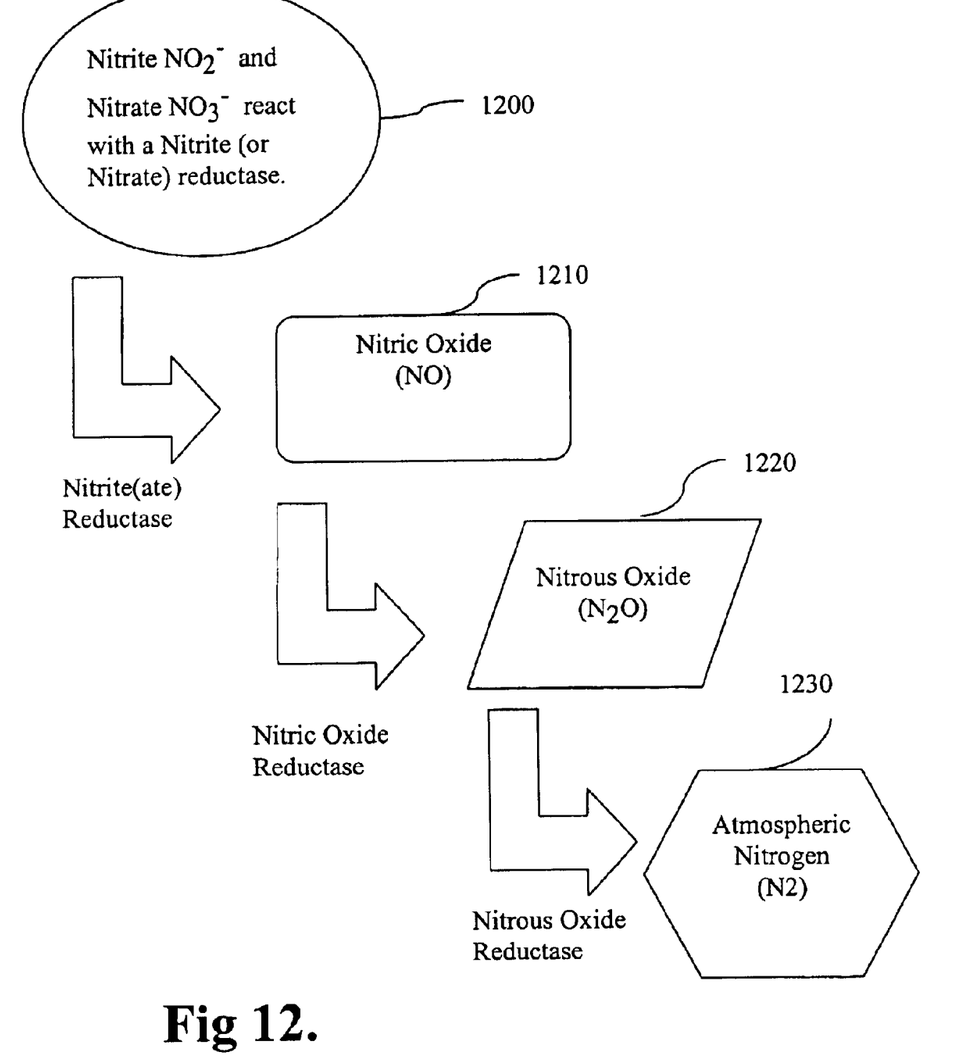
FIG. 12 is a diagrammatic representation of the process whereby Nitrate and Nitrite are reduced to atmospheric nitrogen.

The anaerobic phase is illustrated in FIG. 12. Nitrate and Nitrite 1200, through microbial action, react with a reductase, any catalyst which will begin the reaction, to Nitric Oxide (NO), 1210. Subsequently the Nitric Oxide is converted to Nitrous Oxide ($N_2O$), 1220, and is finally reduced to atmospheric Nitrogen (N2), 1230.

The third step is the settling step. The wastewater remains in the holding tank while the mixing loop operation is discontinued. The settling phase allows the bacteria, or biomass, to settle to the bottom of the tank creating a clarified supernatant water stratum.

The final step (Discharge Step) consists of disinfecting the supernatant water by injection it with ozone. If necessary the water can passed through a filter before being injected. Once the bacteria in the water are deactivated by the ozone exposure, the water is discharged for storage or use.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
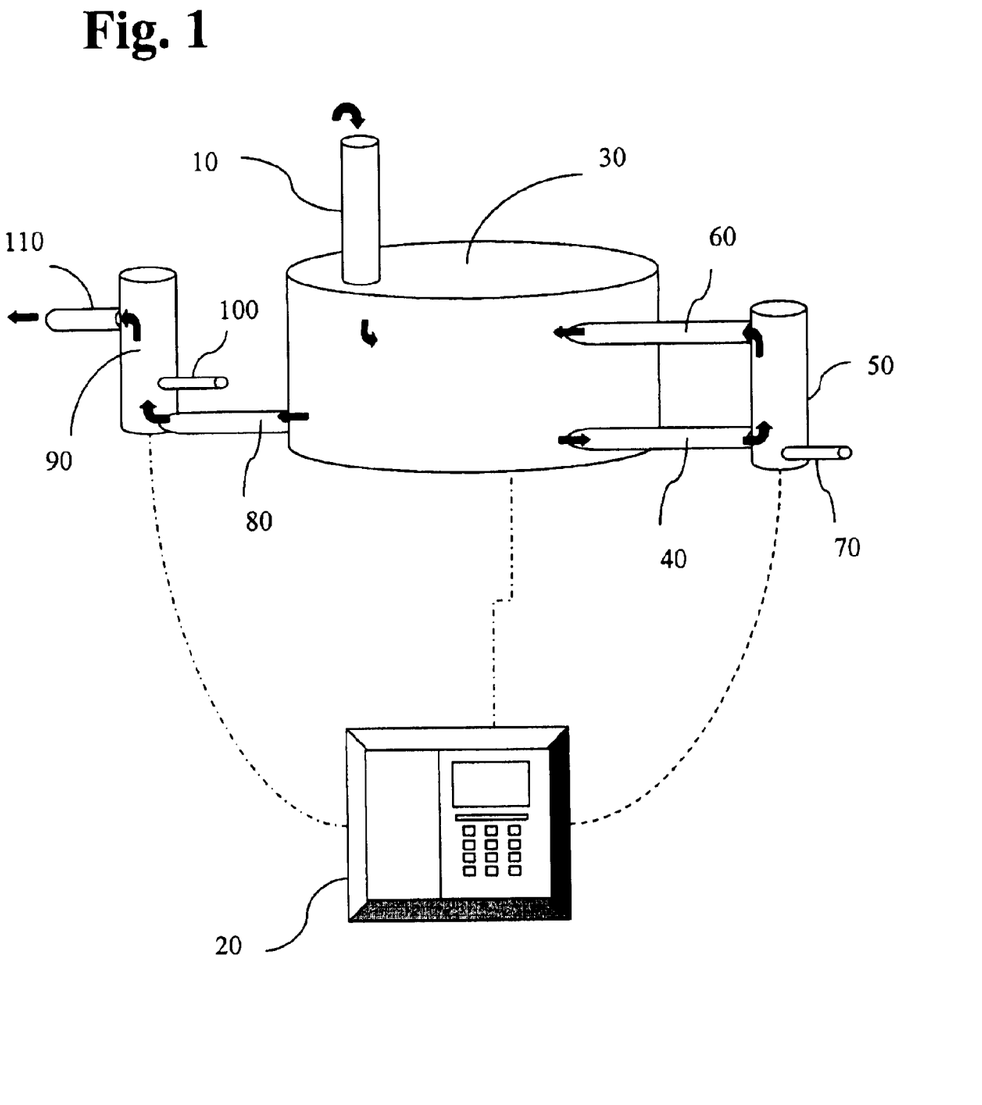
FIG. 1 is a diagrammatic view of the method according to the invention.
Figure 2:
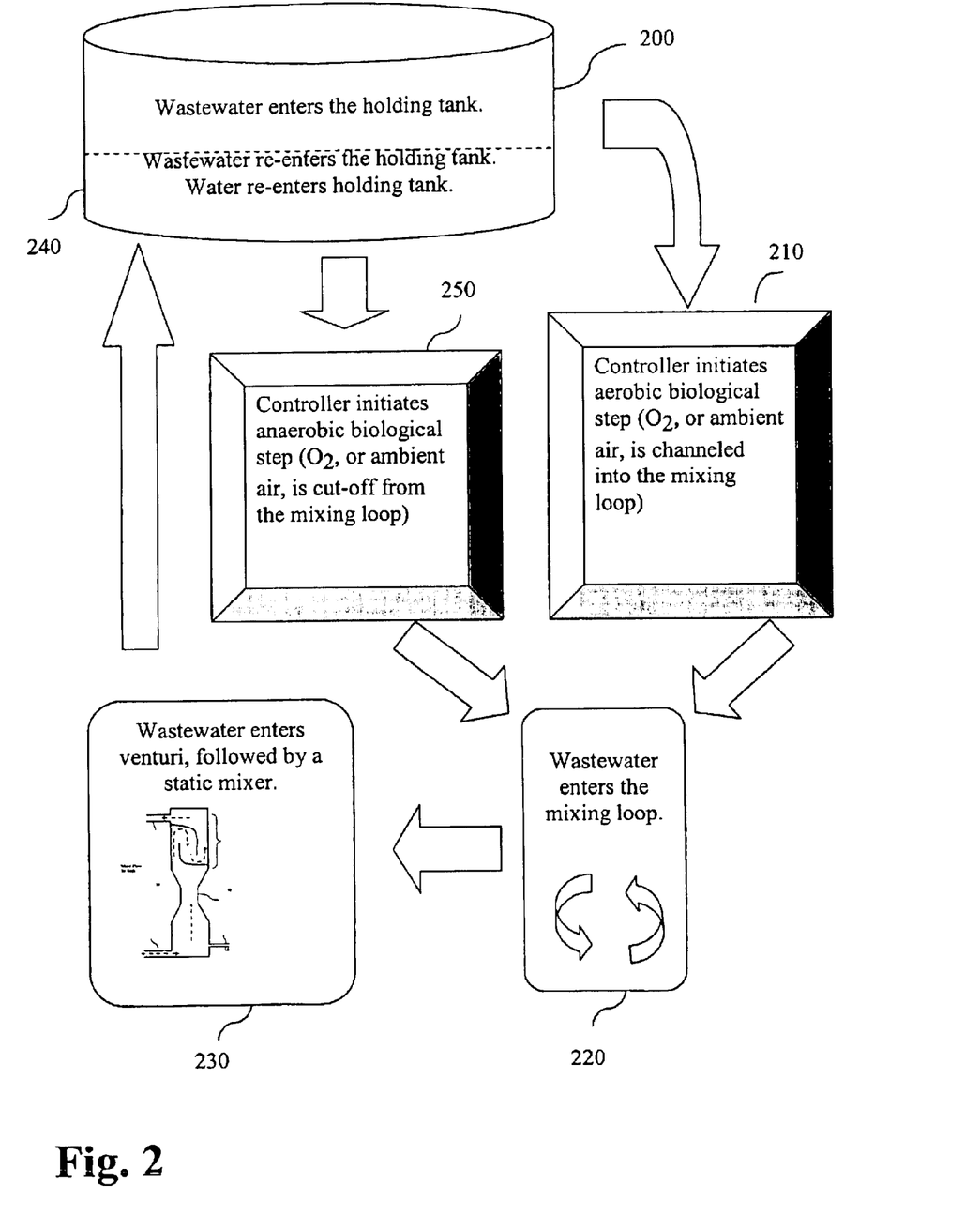
FIG. 2 is a diagrammatic view of the method comprising the aerobic and anaerobic biological steps where a venturi and static mixer are the constituent elements of the mixing block.

An embodiment of the invention is based on carrying out all the steps of treating domestic wastewater in one tank by using a controller that operates via timers and relays or by a programmable logic controller. The purpose of the controller is to govern the sequence and duration of each of the steps. For example: Step 1. Aerobic biological step for 4.0 hours. Step 2. Anaerobic biological step for 5.5 hours. Step 3. Settling step for 1.5 hours. Step 4. Disinfection and discharge for re-use or storage 0.5 hours. Turning now to FIG. 1, the wastewater enters the treatment tank through pipe 10. The controller 20, which is connected to tank 30, will detect the wastewater and start the aerobic biological step. It is well established that for the bacteria to decompose and degrade the biochemical oxygen demand, BOD, in the wastewater, it has to be in direct contact with the wastewater. Therefore, mixing the content of tank 30 during the aerobic biological step is essential. Since this step is aerobic, air or oxygen is introduced in the mixing loop. The mixing loop starts in the treatment 30, the wastewater goes through pipe 40, then through the mixing block 50, through return pipe 60, and back to tank 30. The mixing block, 50, is a system for the introduction and dissolving the air or oxygen required for the aerobic biological step. Mixing block 50 could be a venturi followed by a static mixer, a simple a bubble-diffuser and contact column or any device in the market capable of introducing a gas and dissolving it in water. The air or oxygen is introduced through line 70 from a source that is not shown.

As mentioned above, the sequence and duration of each step is controlled through the controller 20. The controller could be as simple as a timer coupled with relays to initiate and terminate certain function at a certain time interval, or as complicated as a programmable logic controller that must be programmed by the user. The wastewater in the aerobic step is treated for a predetermined length of time, as set by the controller, during which air or oxygen is fed through line 70.

The aerobic step results in the reduction of the BOD, conversion of Organic-Nitrogen into Ammonia-Nitrogen, conversion of Ammonia-Nitrogen into Nitrate-Nitrogen and ultimately into Nitrate-Nitrogen, conversion of Organic-Phosphorous into soluble Phosphate-Phosphorous, reduction of Phosphate-Phosphorous, and creation of a rapidly-settling biomass.

After the aerobic step is completed the controller will initiate the anaerobic step. Although air or oxygen is not required during the anoxic biological step, the wastewater should continue to go through the loop to keep the bacteria in uniform contact with the wastewater. This step is essentially the same as the previous step with the exception that air or oxygen is cut-off. The duration of this step is also controlled by the user. However, it is generally longer than the aerobic step.

It is always required to follow the aerobic step with an anoxic step in order to eliminate the Nitrate-Nitrogen present in the wastewater. The bacteria present in the water column will utilize the oxygen present in the Nitrate-Nitrogen, since during this step air, or oxygen, is not fed through the mixing loop. The result is the conversion of the Nitrate-Nitrogen to Nitrogen and Nitrogen oxide Gases that will be released from the wastewater. As a result, the anoxic step continues to reduce the BOD, converts Nitrate-Nitrogen into Nitrogen gas, allows for additional conversion of Organic-Phosphorous into soluble Phosphate-Phosphorous, and reduces the resulting Phosphate-Phosphorous as the bacteria grow.

Upon the completion of this step, the controller triggers the settling step. During this step, the mixing step is stopped allowing the biomass or bacteria to settle to the bottom of tank 30 and create clarified supernatant water. A minimum of 60 minutes is required for settling. A longer settling duration is preferable but should not exceed 120 minutes.

After this step the wastewater is already treated and the only thing that needs to be accomplished, before reuse, is the deactivation of the bacteria to create pathogen-free water. The clarified water is passed through line 80 to a filter if necessary (not shown), and then through an ozonation system 90. Ozone is provided by an ozone generator (not shown) and delivered through line 100. This system should be capable of introducing and dissolving ozone gas into the treated water. Example of system 90 could be as simple as a venturi followed by a static mixer, a bubble-diffuser with a contact column. The treated water is discharged through the system through line 110 and is ready for re-use.

In one embodiment, as shown in FIGS. 2 through 6, the mixing loop consists of a venturi followed by a static mixer. As seen in the block diagram shown in FIG. 2, wastewater enters the holding tank 200 at which time the controller initiates the aerobic biological step 210. As wastewater enters the mixing loop 220, ambient air, or a gas containing oxygen, is channeled into the venturi, 230. Finally the water leaves the mixing loop and re-enters the holding tank 240. At this point the controller initiates the anaerobic biological step 250, wherein the process begins again, the only difference being that the source of oxygen is cut off from the mixing loop.

Figure 3:
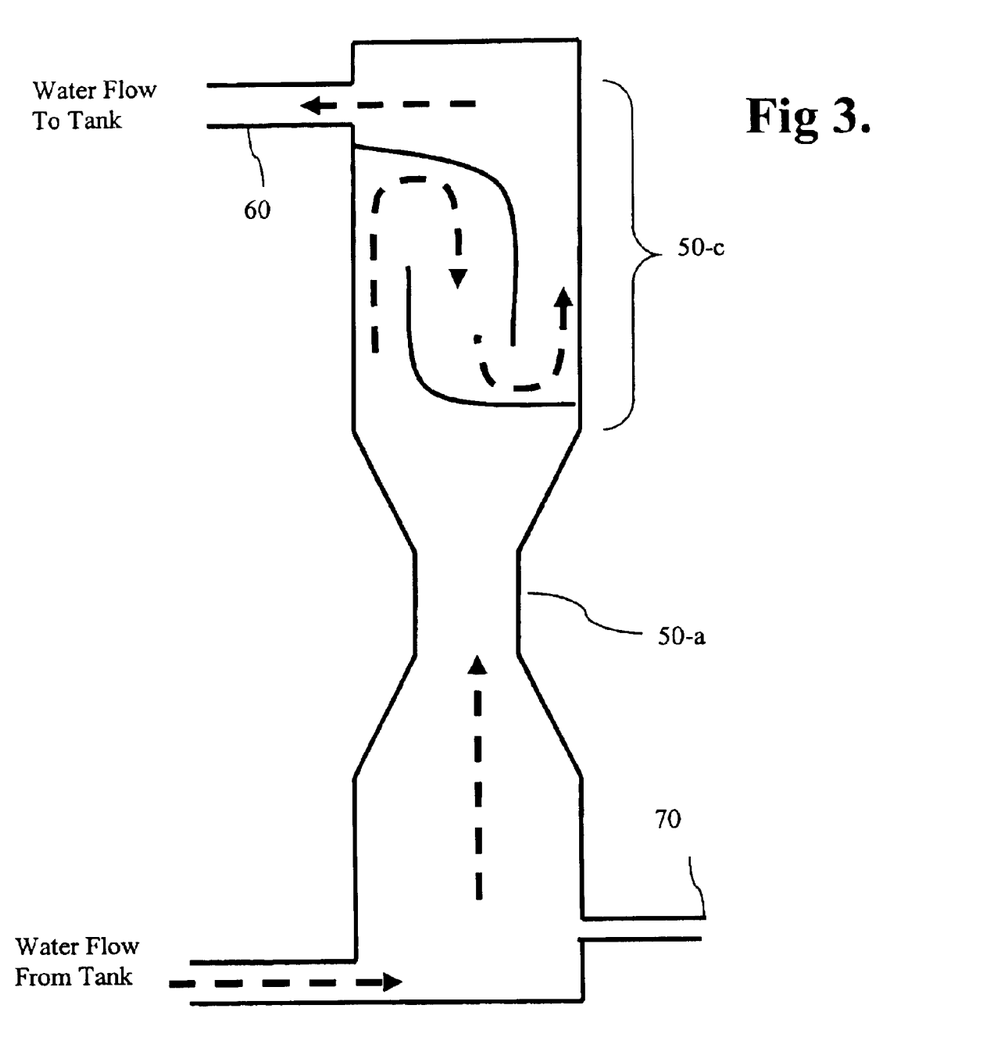
FIG. 3 is a diagrammatic view of the construction, and operation, of the venturi and static mixer as elements of the mixing block.

The construction of the venturi and static mixer, FIG. 3, allows for proper mixing of oxygen and bacteria in the water column. As wastewater enters the venturi 50-$a$ ambient air, or a gas containing oxygen, is channeled via conduit 70, connected to a gas source (not shown). After water passes through venturi 50-$a$, the water enters a static mixer 50-$c$. The mixer is shaped to churn the water as it passes. This facilitates mixing not only of dissolved oxygen, but also of the present bacteria. Finally the water leaves the mixing loop through pipe 40, and re-enters the holding tank.

Figure 4:
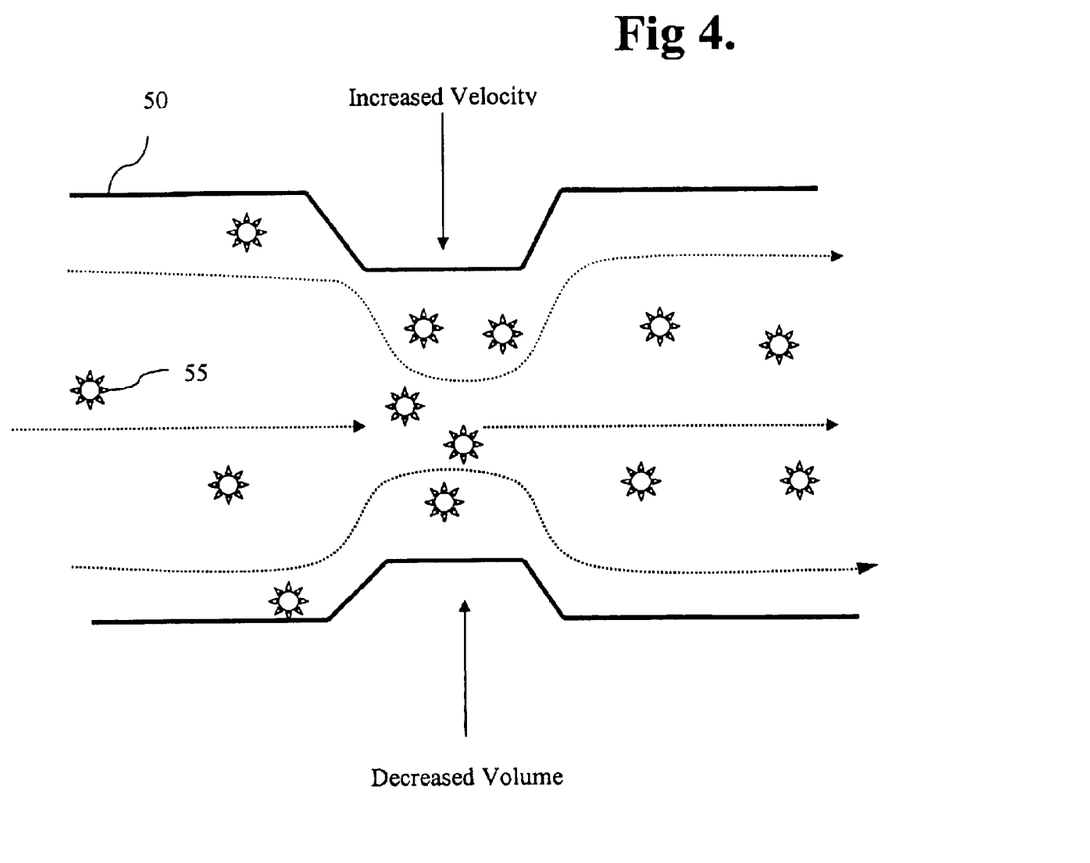
FIG. 4 is a diagrammatic view of the operation of a venturi.

FIG. 4 illustrates how the flow of water, indicated by the directional arrows, is constricted by the walls of the venturi 50. This decrease in volume, and increase in velocity, causes bacteria 55, as well as oxygen, in the water column to come into contact with more water molecules. This ensures a more uniform concentration of oxygen and bacteria throughout the wastewater.

Figure 5:
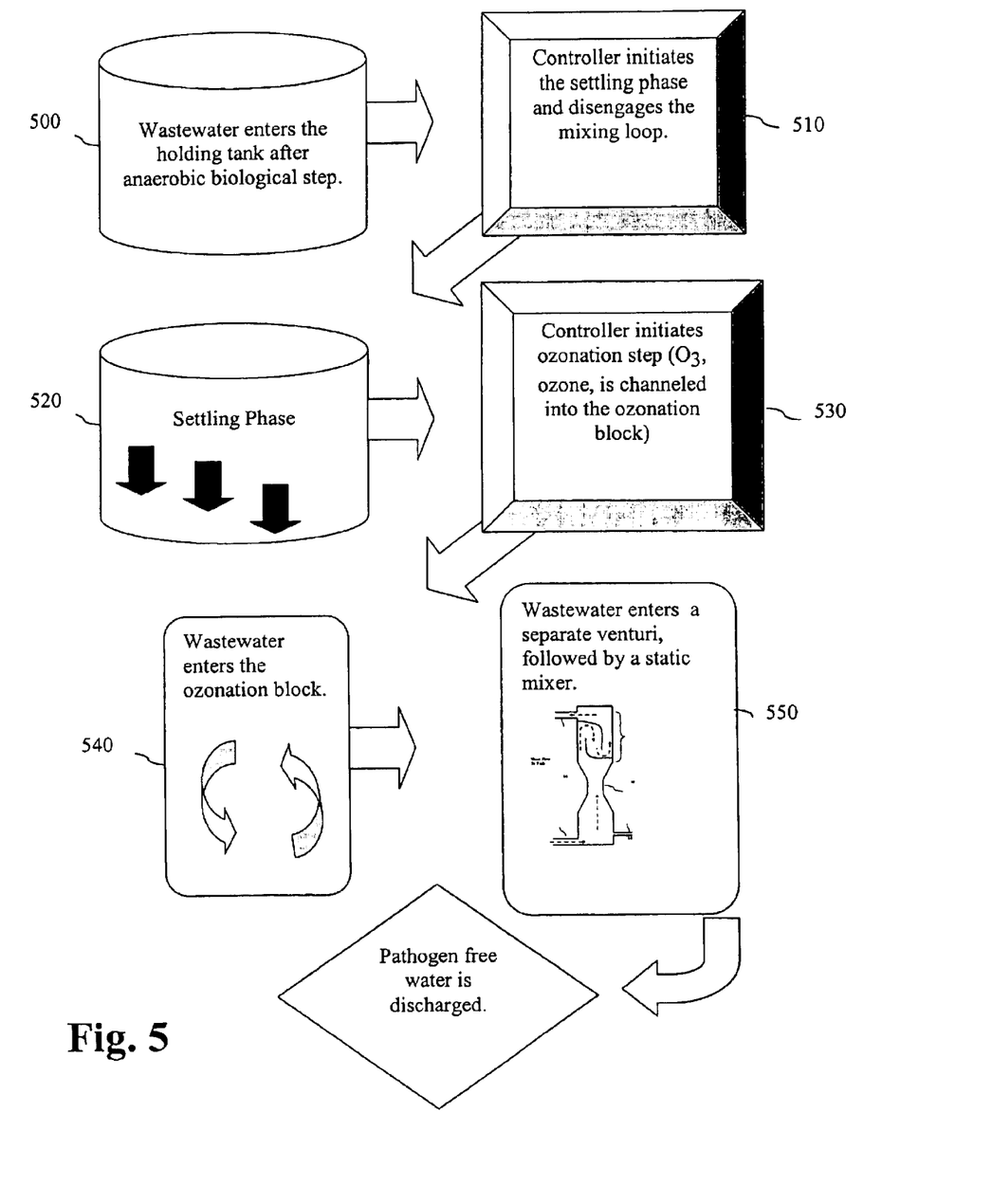
FIG. 5 is a diagrammatic view of the method comprising the settling and disinfecting steps where a venturi and static mixer are the constituent elements of the ozonation block.

Turning to FIG. 5, the final steps of the process include the settling and ozonation phases. Wastewater re-enters the holding tank after having undergone the anaerobic biological step, 500. The controller initiates the settling phase and disengages the mixing loop 510. At this point the biomass in the holding tank is allowed to settle, for 60 to 120 minutes, forming a supernatant water stratum at the bottom of the tank 520. After sufficient time to achieve the precipitation of the supernatant water stratum, the controller initiates the ozonation step, 530, and begins to channel ozone into the ozonation block. The wastewater then enters the ozonation block, 540, which exists independently of the mixing loop. The ozonation block also consists of a venturi followed by a static mixer, 550.

Figure 6:
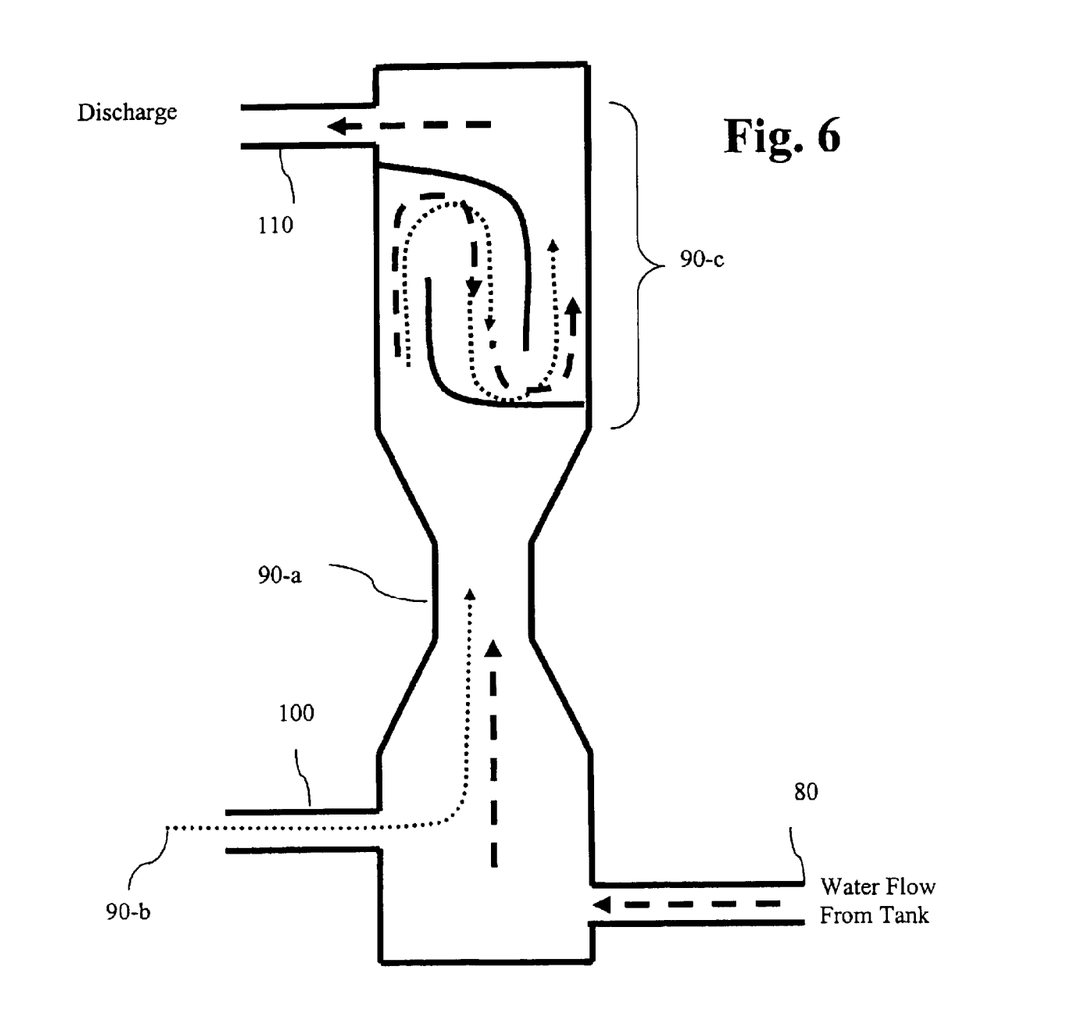
FIG. 6 is a diagrammatic view of the construction, and operation, of the venturi and static mixer as elements of the ozonation block.

FIG. 6 illustrates the construction of the ozonation block, and its similarities to the mixing loop. As the water flow leaves the holding tank through pipe 80, and travels toward the venturi, 90-$a$, the gas conduit, 100, allows a flow of ozone, 90-$b$, rather than ambient air or oxygen, to enter the block. The static mixer, 90-$c$ functions in the same manner as the mixer in the mixing loop and churns the water exposing the present bacteria to the ozone, thus deactivating the bacteria. The detoxified water is then discharged through pipe 110.

Figure 7:
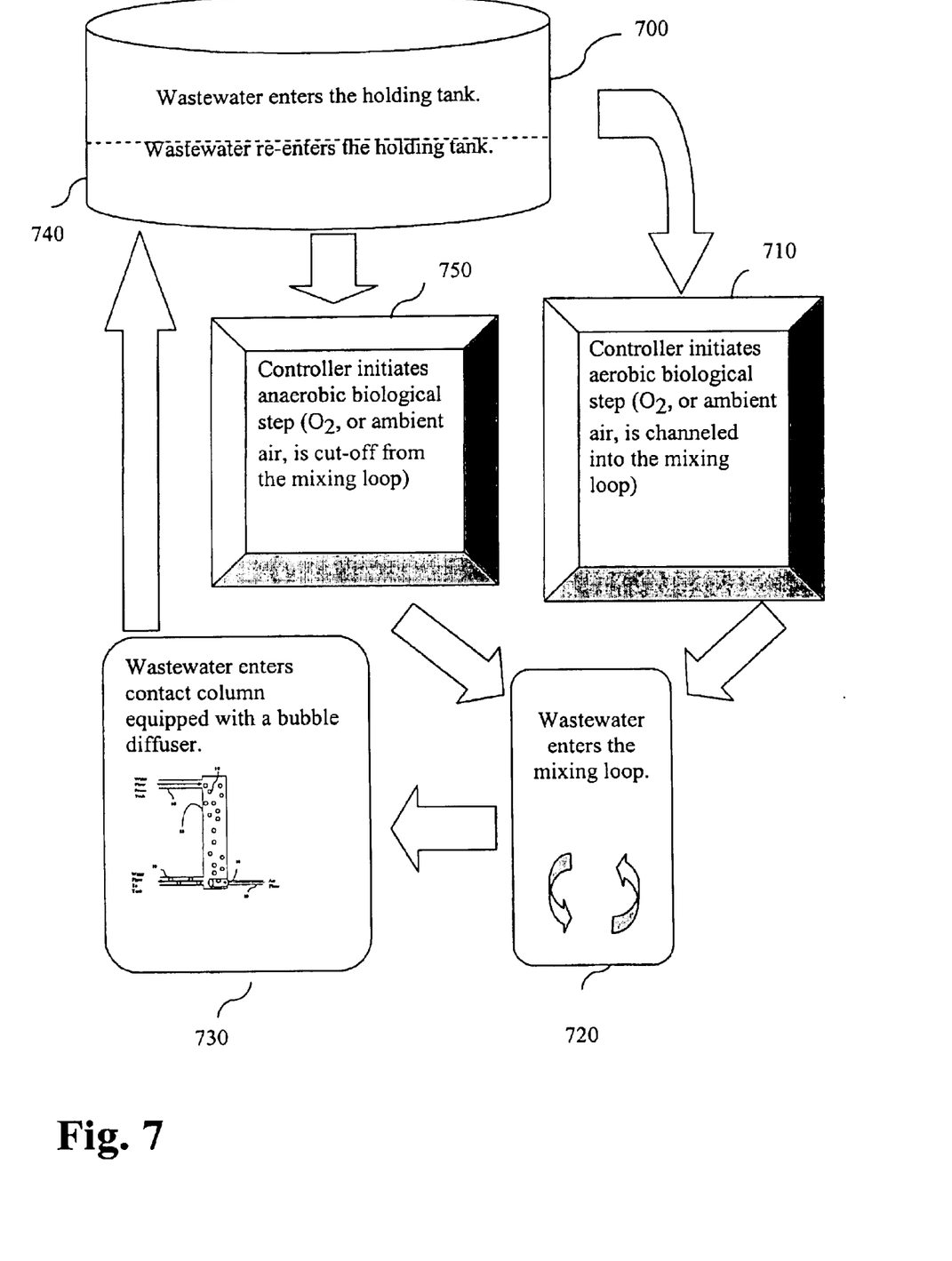
FIG. 7 is a diagrammatic view of the method comprising the aerobic and anaerobic biological steps where a contact column and gas diffuser are the constituent elements of the mixing block.

In another embodiment, as shown in FIGS. 7 through 10, the mixing loop consists of a contact column equipped with a gas diffuser. As seen in FIG. 7, wastewater enters the holding tank 700 at which time the controller initiates the aerobic biological step 710. As wastewater enters the mixing loop 720, ambient air, or a gas containing oxygen, is channeled into the contact column 730. The contact column can be any column known in the art, for example U.S. Pat. No. 6,464,210. Subsequently, the water leaves the mixing loop and re-enters the holding tank 740. At this point the controller initiates the anaerobic biological step, 750, wherein the process begins again, the only difference being that the source of oxygen is cut off from the mixing loop.

Figure 8:
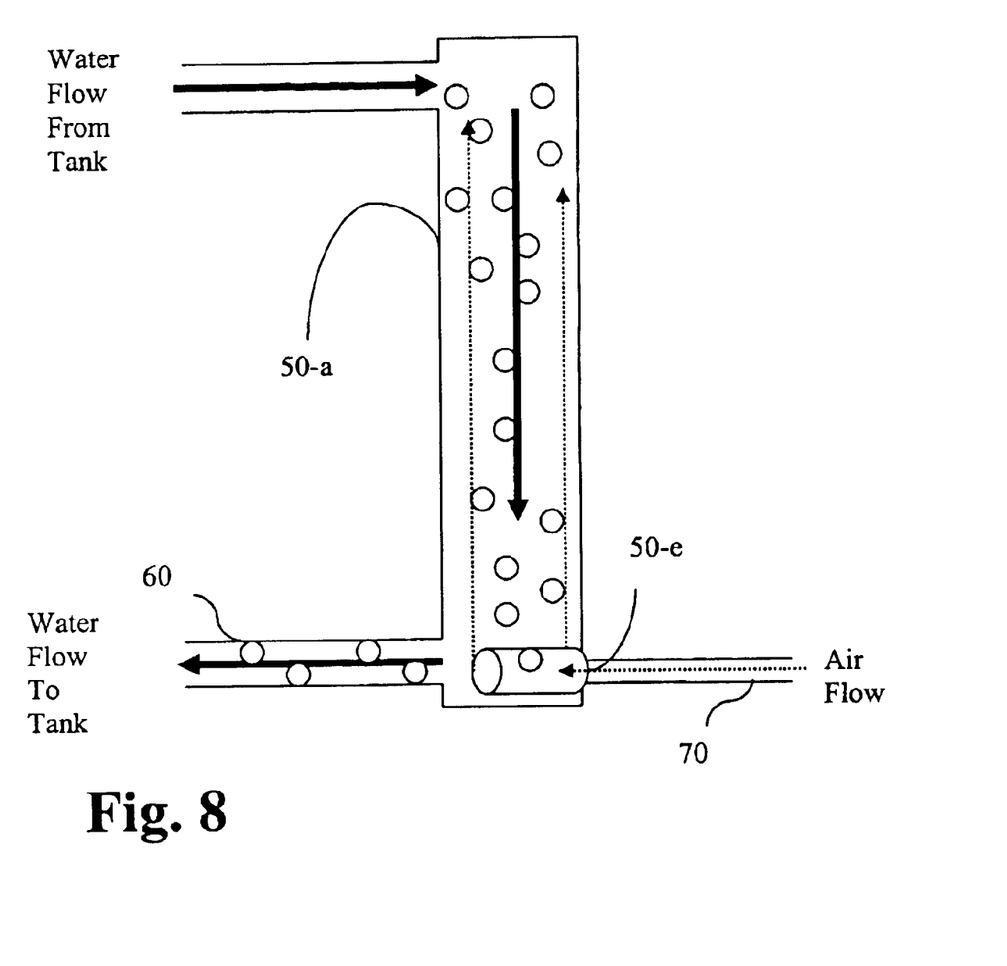
FIG. 8 is a diagrammatic view of the construction, and operation, of the contact column and gas diffuser as elements of the mixing block.

The presence of the gas diffuser in the contact column as shown in FIG. 8, allows for proper mixing of oxygen and bacteria in the water column. As wastewater enters the mixing column, ambient air, or a gas containing oxygen, is channeled via conduit 2070, connected to a gas source (not shown). As the gas enters the contact column, it passes through a membrane 50-*e* which diffuses the incoming gas. The gas and water flow in opposite directions, this counter-current results in greater distribution of oxygen throughout the water column. The agitation of the gas diffuser also increases mixing of the necessary bacteria. The water then leaves the mixing loop through pipe 60, and re-enters the holding tank.

Figure 9:
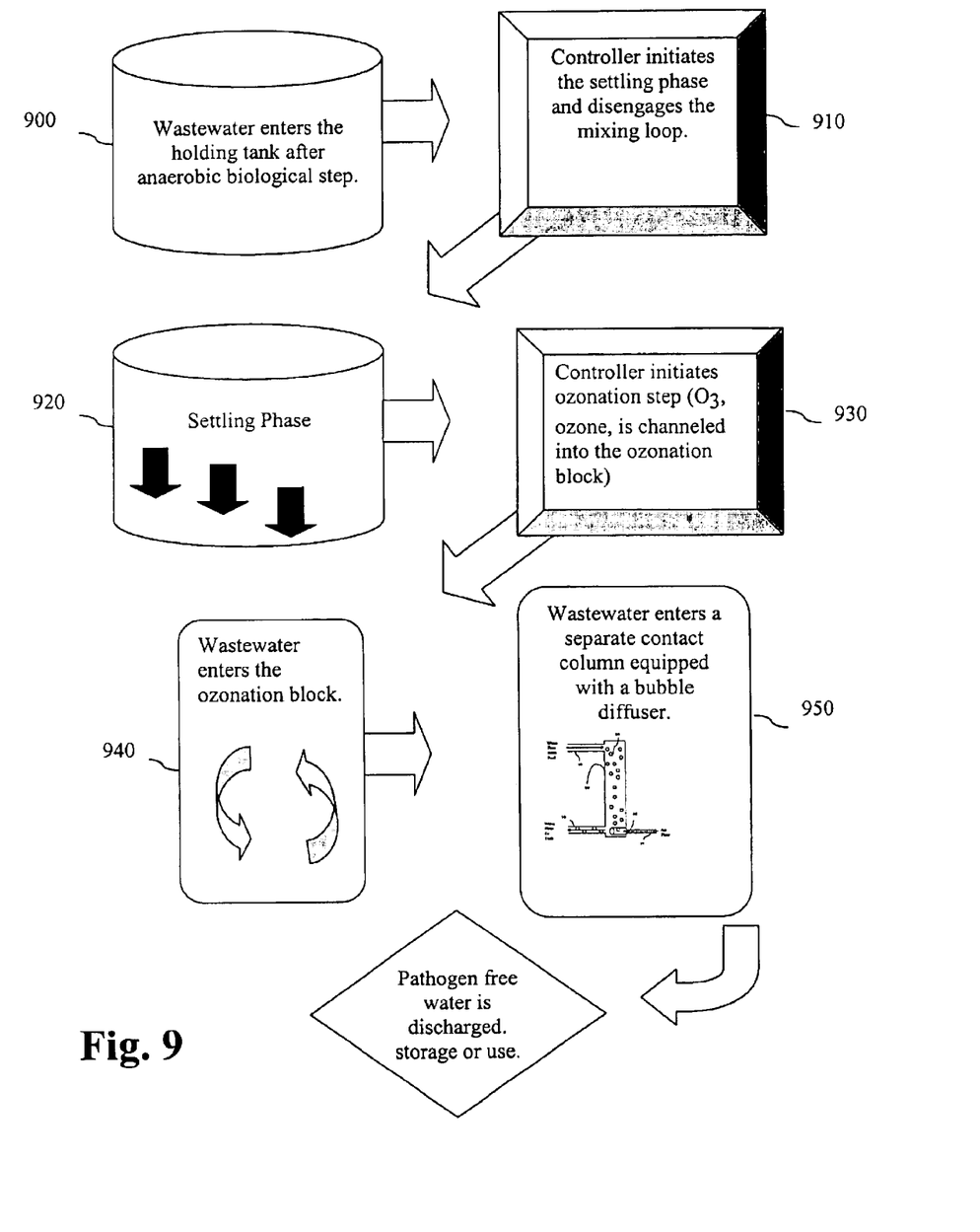
FIG. 9 is a diagrammatic view of the method comprising the settling and disinfecting steps where the contact column and gas diffuser are the constituent elements of the ozonation block.

Turning to FIG. 9, the final steps of the process include the settling and ozonation phases. Wastewater re-enters the holding tank after having undergone the anaerobic biological step, 900. The controller initiates the settling phase and disengages the mixing loop 910. At this point the biomass in the holding tank is allowed to settle, for 60 to 120 minutes, forming a supernatant water stratum at the bottom of the tank 920. After sufficient time to achieve the precipitation of the supernatant water stratum, the controller initiates the ozonation step, 930, and begins to channel ozone into the ozonation block. The wastewater then enters the ozonation block, 940, which exists independently of the mixing loop. The ozonation block also consists of a contact column equipped with a gas diffuser, 950.

Figure 10:
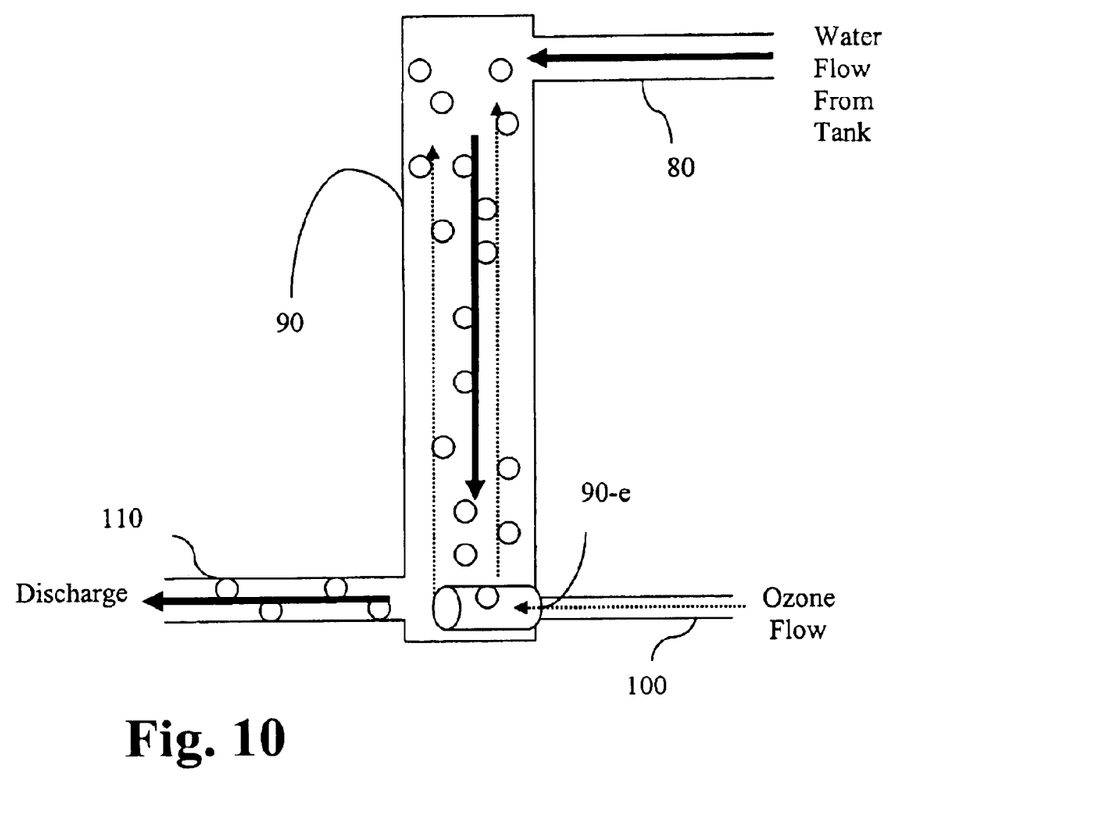
FIG. 10 is a diagrammatic view of the construction, and operation, the contact column and gas diffuser as elements of the ozonation block.

FIG. 10 illustrates the construction of the ozonation block, and its similarities to the mixing loop. As the water flow leaves the holding tank through pipe 80 and enters the contact column, 90, the gas conduit, 100, allows a flow of ozone rather than ambient air or oxygen, to enter the block. As the ozone enters the contact column, it passes through a membrane, 90-*e*, which diffuses the incoming ozone. As shown in FIG. 8, the gas and water flow in opposite directions, this counter-current causes greater distribution of oxygen throughout the water column. The agitation of the gas diffuser also increases exposure of the necessary bacteria to the ozone. The detoxified water is then discharged through pipe 110.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of purifying domestic waste water on site, the method comprising the steps of:
   collecting the waste water in a holding tank;
   providing a mixing loop in fluid communication with the holding tank;
   agitating the waste water in an aerobic environment by passing the waste water through the mixing loop;
   agitating the waste water in an anaerobic environment by passing the waste water through the mixing loop;
   precipitating matter from the waste water whereby a supernatant water strata is formed;
   extracting a supernatant layer from the waste water; and
   disinfecting the resultant supernatant layer during extraction.

2. The method of claim 1 further comprising the step of filtering the supernatant layer.

3. The method of claim 1 further comprising the step of ozonating the supernatant layer.

4. The method of claim 2 further comprising the step of ozonating the supernatant layer.

5. The method of claim 1 wherein the step of precipitating matter from the waste water is conducted for a period between 60 and 120 minutes.

6. The method of claim 1 wherein the method is conducted in situ.

7. The method of claim 1 wherein the waste water is collected in a single holding tank.

8. The method of claim 7 wherein the exposure to anaerobic and aerobic environments takes place in the single holding tank.

9. The method of claim 8 wherein the precipitation takes place in the single holding tank.

10. The method of claim 7 wherein the extracted supernatant is stored in a separate holding tank.

11. The method of claim 10 wherein stored supernatant is retreated.

12. The method of claim 7 further comprising the steps of:
    providing a mixing block in fluid communication with the mixing loop; and
    providing a gas induction system in fluid communication with the mixing block whereby waste water flows through the mixing loop from the holding tank into the mixing block where it is exposed to the aerobic and anaerobic environments prior to the step of precipitating matter from the waste water and extracting the supernatant.

13. The method of claim 7 further comprising the step of initiating and terminating each step by a programmable logic controller.

14. The method of claim 7 further comprising the step of initiating and terminating each step by a timer and relay apparatus.

15. A method of purifying domestic waste water on site comprising the steps of:
    collecting the wastewater;
    providing a mixing loop:
    detoxifying the waste water in an aerobic environment by passing the water through the mixing loop;
    detoxifying the waste water in an anaerobic environment by passing the water through the mixing loop;
    precipitating matter from the waste water for 60 to 120 minutes whereby a supernatant water strata is formed;
    filtering the supernatant layer;
    ozonating the supernatant layer; and
    extracting a supernatant layer from the waste water.

* * * * *